United States Patent
Brunswig et al.

(10) Patent No.: US 7,890,959 B2
(45) Date of Patent: Feb. 15, 2011

(54) SYSTEM AND METHOD FOR MESSAGE LIFETIME MANAGEMENT

(75) Inventors: Frank Brunswig, Heidelberg (DE); Ioannis Grammatikakis, Maxdorf (DE); Dinu Pavithran, Bangalore (IN); Guenter Pecht-Seibert, Muehlhausen (DE); Michael Picht, Walldorf (DE); Alexander Rauh, Weinheim (DE); Holger Schmidt, Sinsheim (DE)

(73) Assignee: SAP AG, Walldorf (DE)

( * ) Notice: Subject to any disclaimer, the term of this patent is extended or adjusted under 35 U.S.C. 154(b) by 991 days.

(21) Appl. No.: 11/729,860

(22) Filed: Mar. 30, 2007

(65) Prior Publication Data
US 2008/0244616 A1 Oct. 2, 2008

(51) Int. Cl.
G06F 3/048 (2006.01)
(52) U.S. Cl. .......................... 719/315; 719/313; 719/314
(58) Field of Classification Search .................. None
See application file for complete search history.

(56) References Cited

U.S. PATENT DOCUMENTS

2004/0221204 A1* 11/2004 Johnson ....................... 714/47
2008/0244319 A1* 10/2008 Nehab et al. .................. 714/38

* cited by examiner

Primary Examiner—H. S. Sough
Assistant Examiner—Syed Roni
(74) Attorney, Agent, or Firm—Kenyon & Kenyon LLP

(57) ABSTRACT

A system and method for message lifetime management. According to an embodiment of the invention, a front-end application process identifies during a user interface interaction cycle of the front-end application process at least one stateful message reported to the front-end application process by a back-end service process during a prior user interface interaction cycle of the front-end application process, the at least one stateful message having been stored in a message buffer by the front-end application process, queries the back-end service process to determine whether the at least one stateful message is currently valid, and removes the at least one stateful message from the message buffer if it is determined not to be currently valid.

17 Claims, 4 Drawing Sheets

SYSTEM AND METHOD FOR MESSAGE LIFETIME MANAGEMENT

BACKGROUND OF THE INVENTION

Development of a complex software system usually involves defining an object model that represents the desired structure and functionality of objects to be implemented in an application framework. In business software environments, these objects are sometimes referred to as business objects, which can be defined according to a node structure that may specify corresponding data elements and behaviors to be associated with the objects.

Once the object model is defined, developers are able to produce code for the application framework that implements the defined objects. The application framework acts as a service provider and generally provides the back-end level functionality for the software system. Once completed, developers are then able to code the front-end aspects of the software system, such as the user interface portion of the system providing specific application contexts and usage scenarios, which hooks into and depends upon the back-end level functionality.

Because the back-end functionality of such systems is designed to support diverse front-end components, the back-end is often not aware of the front-end's specific application context and usage scenario when responding to a service call from the front-end. This lack of awareness can lead to unfavorable message handling issues for the front-end component in connection with stateful messages, which are relevant beyond the period of the particular call.

For example, the back-end reports messages (e.g., error, warning, information, success) to the front-end that are relevant to the back-end's processing of a particular call from the front-end. But upon completion of the processing of the call, the back-end may become aware of a change in a state upon which the reporting of an stateful message was based, that invalidates the stateful message (e.g., a warning message caused by a particular event may no longer be valid when a subsequent event occurs).

The back-end does not report to the front-end that the message is no longer valid, because the back-end is not aware of the front-end's ability or desire to receive such an updated message. Thus, in situations in which the front-end is available to receive the updated message before passing the invalid message on to an end user, the front-end unfortunately displays the invalid message to the end user.

Accordingly, there is a need in the art for a system and method that reduces the unfavorable message handling issues between front-end and back-end system components.

DETAILED DESCRIPTION

Embodiments of the present invention reduce the unfavorable message handling issues between front-end and back-end system components by providing a front-end component that stores and manages the lifetime of stateful back-end messages. The front-end component continually confirms the validity of the stateful back-end messages prior to displaying them to the user, thus minimizing the display of inappropriate or invalid messages to the end user.

Figure 1:
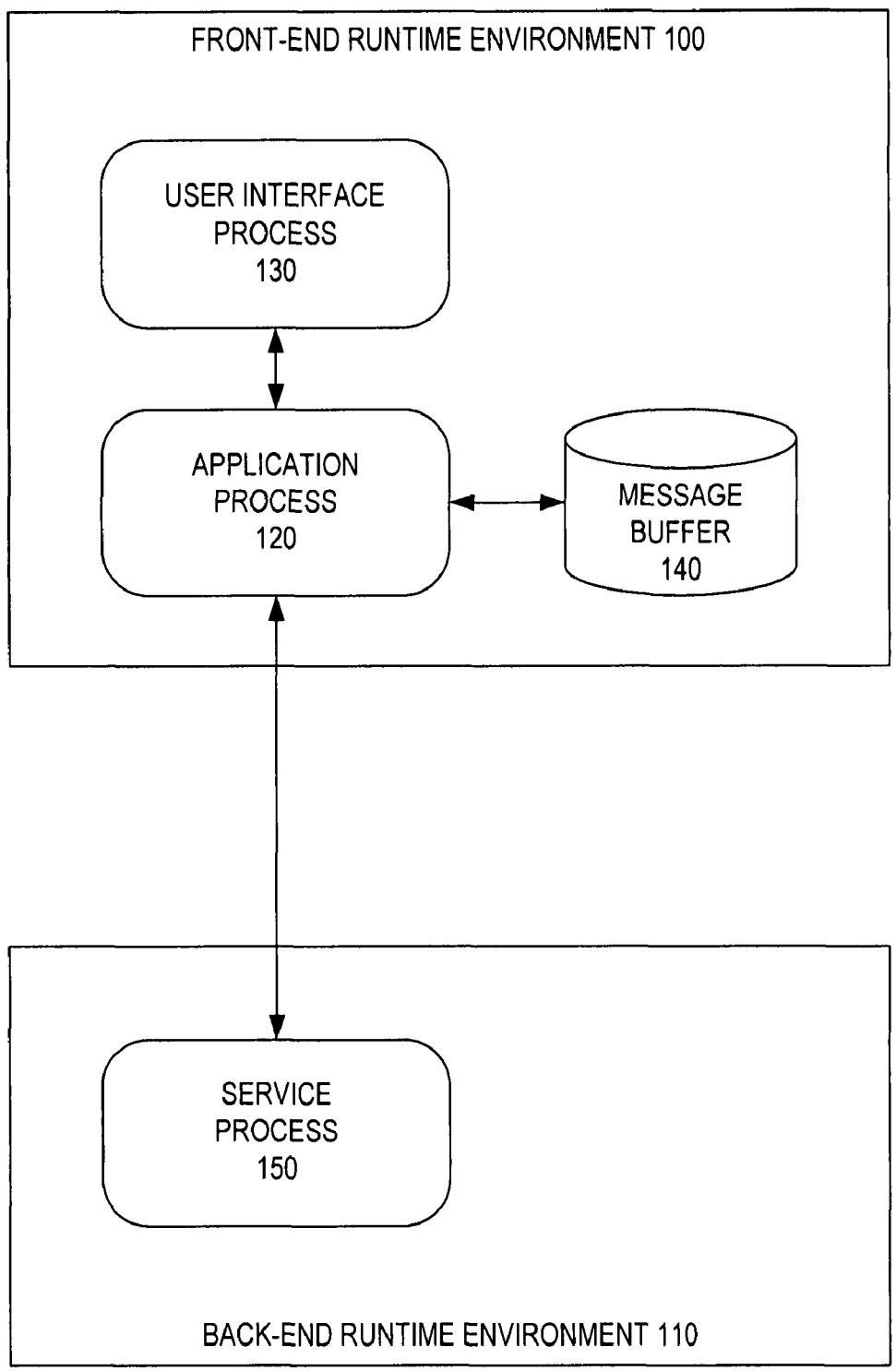
FIG. 1 is a block diagram that depicts a system architecture in accordance with an embodiment of the present invention.

FIG. 1 depicts a front-end and back-end system architecture in accordance with an embodiment of the present invention. A front-end runtime environment (100) includes an application process (120) in communication with a user interface process (130) and a message buffer (140). A back-end runtime environment (110) includes a service process (150) in communication with the application process (120).

Figure 2:
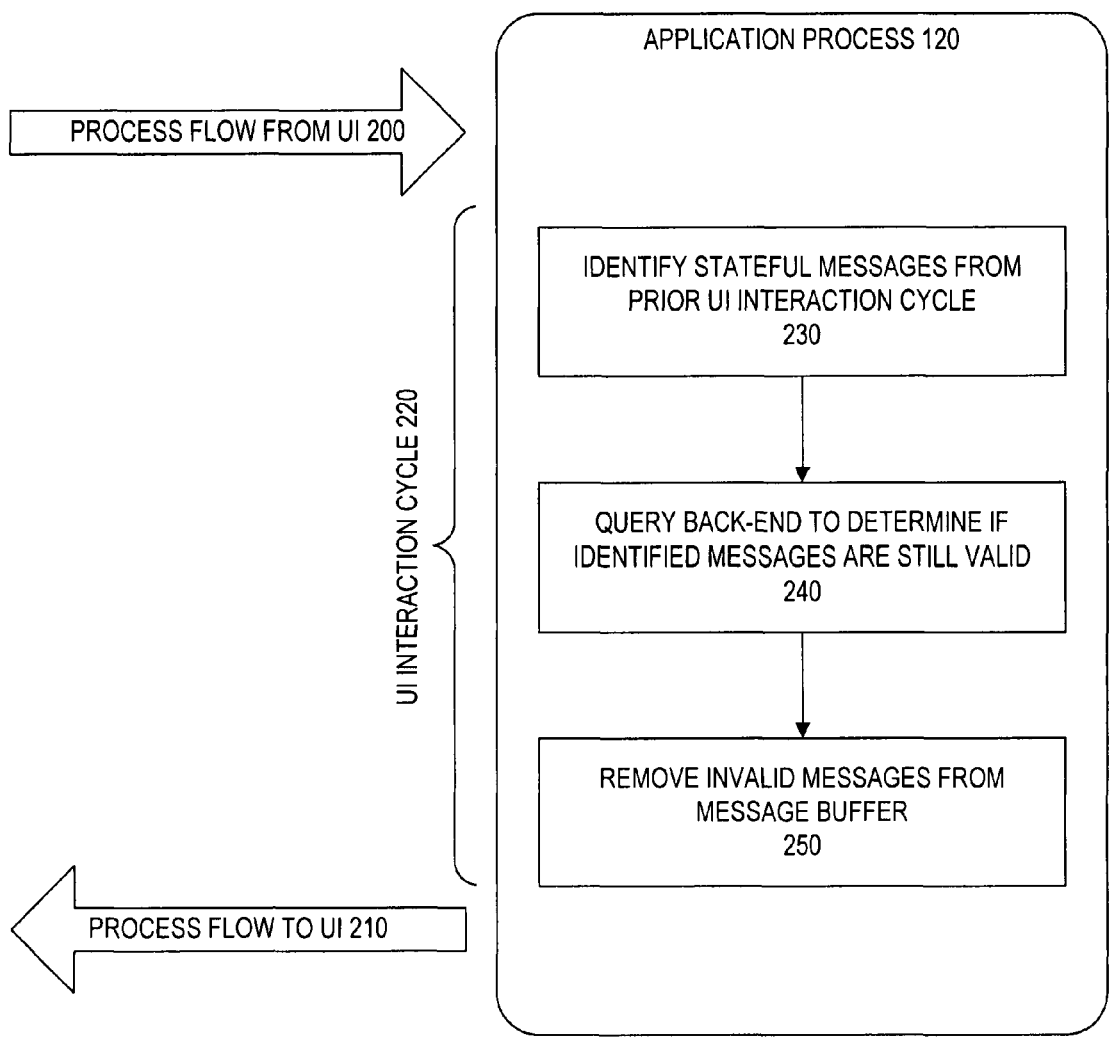
FIG. 2 is a process flow diagram that depicts a message lifetime management process in accordance with an embodiment of the present invention.

FIG. 2 depicts a message lifetime management process in accordance with an embodiment of the present invention, which occurs during a user interface interaction cycle (220)—the period between the application process (120) receiving (200) the process flow from the user interface process (130) and returning (210) the process flow to the user interface process (130).

Within this user interface interaction cycle (220), the application process (120) identifies (step 230) stateful messages that were reported to the application process (120) by the service process (150) during a prior user interface interaction cycle. The application process (120) stored these messages in the message buffer (140) as they were reported.

The application process (120) then queries (step 240) the service process (150) to determine whether the identified messages are currently valid. In an embodiment of the present invention, the application process (120) can invoke a check function to which the service process (150) replies with a list of all messages that are currently relevant for the calling process (120). The application process (120) then need only compare the identified messages with the list to determine whether they remain valid. The application process (120) then removes (step 250) any message from the message buffer (150) that is determined not to be currently valid.

Figure 3:
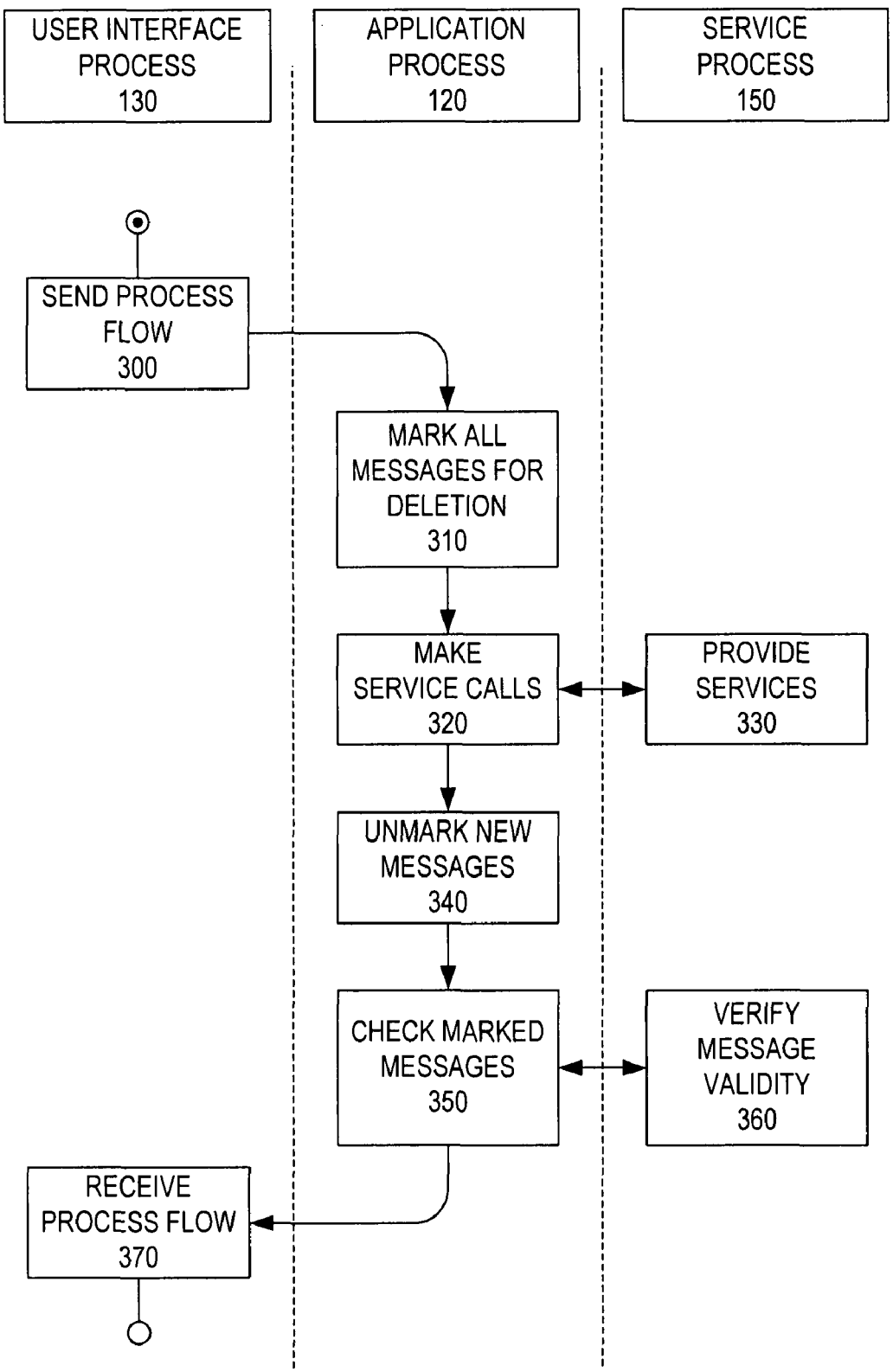
FIG. 3 is a process flow diagram that depicts a message lifetime management process in accordance with an embodiment of the present invention.

FIG. 3 depicts a message lifetime management process in accordance with another embodiment of the present invention that utilizes a mark and sweep algorithm to remove invalid messages. At the start of a user interaction cycle (step 300), the application process (120) marks all messages as deleted (step 310). Subsequent to the marking, the application process (120) makes routine service calls (step 320) to the service process (150), which processes the calls and responds (step 330). Any messages reported from the service process (150) during this interaction cycle are stored in the message buffer (140) and not marked as deleted (step 340).

Thus, at the end of the interaction cycle all messages that were reported in the current cycle are marked as still valid (or, conversely, not marked as deleted). For all other messages which are marked as deleted, the application process (120) checks (step 350) with the service process (150) to see if the problems that resulted in the reporting of those messages still exist (step 360). The messages that are verified to be invalid are deleted so as not to be displayed to the user when the process flow returns (370) to the user interface process (130).

In another embodiment of the present invention, the marking step (310) could occur at the end of the interaction cycle (but prior to step 350), as long as the application process (120) can differentiate the messages that were reported during prior cycles from those reported in the current cycle (so that those reported in the current cycle are not marked for deletion).

Figure 4:
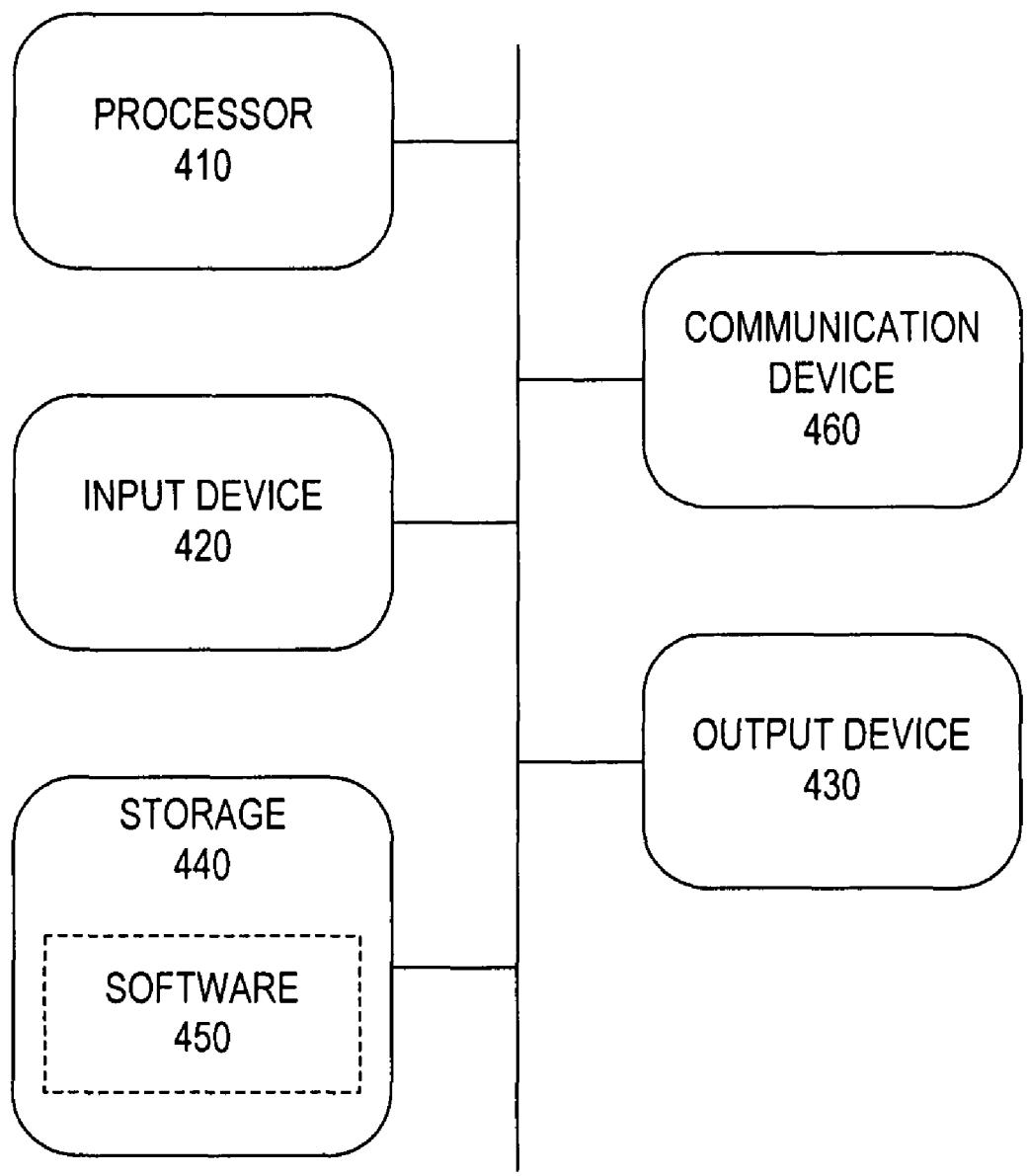
FIG. 4 is a block diagram that depicts a computing device in accordance with an embodiment of the present invention.

FIG. 4 illustrates the components of a basic computing device in accordance with an embodiment of the present invention, which may provide the front-end runtime environment (100) and back-end runtime environment (110). The computing device may be a workstation, server, personal computer, handheld computing device, or any other type of microprocessor-based device. The computing device may include one or more of a processor (410), input device (420), output device (430), storage (440), and communication device (460).

The input device (420) may include a keyboard, mouse, pen-operated touch screen or monitor, voice-recognition device, or any other device that provides input. The output device (430) may include a monitor, printer, disk drive, speakers, or any other device that provides output.

The storage (440) may include volatile and nonvolatile data storage, including one or more electrical, magnetic or optical memories such as a RAM, cache, hard drive, CD-ROM drive, tape drive or removable storage disk. The communication device (460) may include a modem, network interface card, or any other device capable of transmitting and receiving signals over a network. The components of the computing device may be connected in any manner, such as via electrical bus or wirelessly.

The software (450), which may be stored in the storage (440) and executed by the processor (410), may include, for example, the application programming that embodies the functionality of the present invention (e.g., as embodied in the front-end runtime environment (100) and back-end runtime environment (110)). The software (450) may include a combination of client applications and enterprise servers such as an application server and a database server.

Communications in connection with the present invention may occur over any type of interconnected communication system/network, which may implement any communications protocol, which may be secured by any security protocol. Corresponding network links may include telephone lines, DSL, cable networks, T1 or T3 lines, wireless network connections, or any other arrangement that implements the transmission and reception of network signals.

The computing device may implement any operating system, such as Windows or UNIX. The software (450) may be written in any programming language, such as ABAP, C, C++, lava or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

For example, software modules that implement the present invention such as the front-end runtime environment (100) and back-end runtime environment (110) may comprise several discrete modules that together still provide the same functionality, data specified in the illustrated message buffer (140) may be spread over several databases and/or systems, and the flow diagram of FIGS. 2-3 may encompass combined steps or several intermediate steps that do not detract from the higher level functionality described therein.

What is claimed is:

1. A method for message lifetime management, comprising:
   identifying, by a front-end application process during a user interface interaction cycle of the front-end application process, a stateful message from a message buffer, the identified stateful message being reported to the front-end application process by a back-end service process during a prior user interface interaction cycle of the front-end application process and having been stored in the message buffer by the front-end application process;
   querying the back-end service process by the front-end application process to determine a status of the identified stateful message; and
   removing by the front-end application process the identified stateful message from the message buffer if it is determined not to be currently valid, wherein the identifying step comprises:
      marking for deletion one or more stateful messages that were stored in the message buffer prior to the user interface interaction cycle;
      removing the deletion mark of any of the one or more stateful messages that are reported to the front-end application process by the back-end service process during the user interface interaction cycle; and
      identifying as the identified stateful message one of the one or more stateful messages that remain marked for deletion after the marking and removing steps.

2. The method of claim 1, wherein the identified stateful message includes an error message.

3. The method of claim 1, wherein the identified stateful message includes a warning message.

4. The method of claim 1, wherein the identified stateful message includes a success message.

5. The method of claim 1, wherein the one or more stateful messages are marked for deletion at a beginning of the user interface interaction cycle.

6. The method of claim 1, wherein the one or more stateful messages are marked for deletion at an end of the user interface interaction cycle.

7. The method of claim 1, wherein the identified stateful message is identified at an end of the user interface interaction cycle.

8. A system for message lifetime management, comprising:
   a computing device comprising a computer processor, the computer processor executing program instructions to:
   deploy a service process on a back-end runtime environment;
   deploy an application process on a front-end runtime environment, the front-end runtime environment communicatively linked to the back-end runtime environment; and
   communicatively link a message buffer to the front-end runtime environment, the message buffer storing messages reported to the application process by the service process, wherein
   the application process is configured to:
      identify and mark for deletion all stateful messages that were stored in the message buffer prior to the user interface interaction cycle;
      make routine service calls to the service process;
      store stateful messages newly received from the service process to the message buffer;
      mark the newly received stateful messages as valid;
      check with the service process to determine status of messages marked for deletion; and
      delete messages verified to be invalid to avoid displaying these invalid messages.

9. The system of claim 8, wherein the stateful messages identified and marked for deletion include one or more of: an error message, a warning message, and a success message.

10. The system of claim 8, wherein the stateful messages that were stored in the message buffer prior to the user interface interaction cycle are identified and marked for deletion at a beginning of the user interface interaction cycle.

11. The system of claim 8, wherein the stateful messages that were stored in the message buffer prior to the user interface interaction cycle are identified and marked for deletion at an end of the user interface interaction cycle.

12. The system of claim 11, wherein the identifying and marking include differentiate the newly received stateful messages from the stateful messages that were stored in the message buffer prior to the user interface interaction cycle.

13. A non-transitory computer readable storage medium storing thereon program instructions that, when executed, cause an executing device to:
- deploy a service process on a back-end runtime environment;
- deploy an application process on a front-end runtime environment, the front-end runtime environment communicatively linked to the back-end runtime environment; and
- communicatively link a message buffer to the front-end runtime environment, the message buffer storing messages reported to the application process by the service process, wherein
- the application process is configured to:
  - identify and mark for deletion all stateful messages that were stored in the message buffer prior to the user interface interaction cycle;
  - make routine service calls to the service process;
  - store stateful messages newly received from the service process to the message buffer;
  - mark the newly received stateful messages as valid;
  - check with the service process to determine status of messages marked for deletion; and
  - delete messages verified to be invalid to avoid displaying these invalid messages.

14. The non-transitory computer readable storage medium of claim 13, wherein the stateful messages identified and marked for deletion include one or more of: an error message, a warning message, and a success message.

15. The non-transitory computer readable storage medium of claim 13, wherein the stateful messages that were stored in the message buffer prior to the user interface interaction cycle are identified and marked for deletion at a beginning of the user interface interaction cycle.

16. The non-transitory computer readable storage medium of claim 13, wherein the stateful messages that were stored in the message buffer prior to the user interface interaction cycle are identified and marked for deletion at an end of the user interface interaction cycle.

17. The non-transitory computer readable storage medium of claim 16, wherein the identifying and marking include differentiate the newly received stateful messages from the stateful messages that were stored in the message buffer prior to the user interface interaction cycle.

* * * * *